United States Patent Office 2,923,395
Patented Feb. 2, 1960

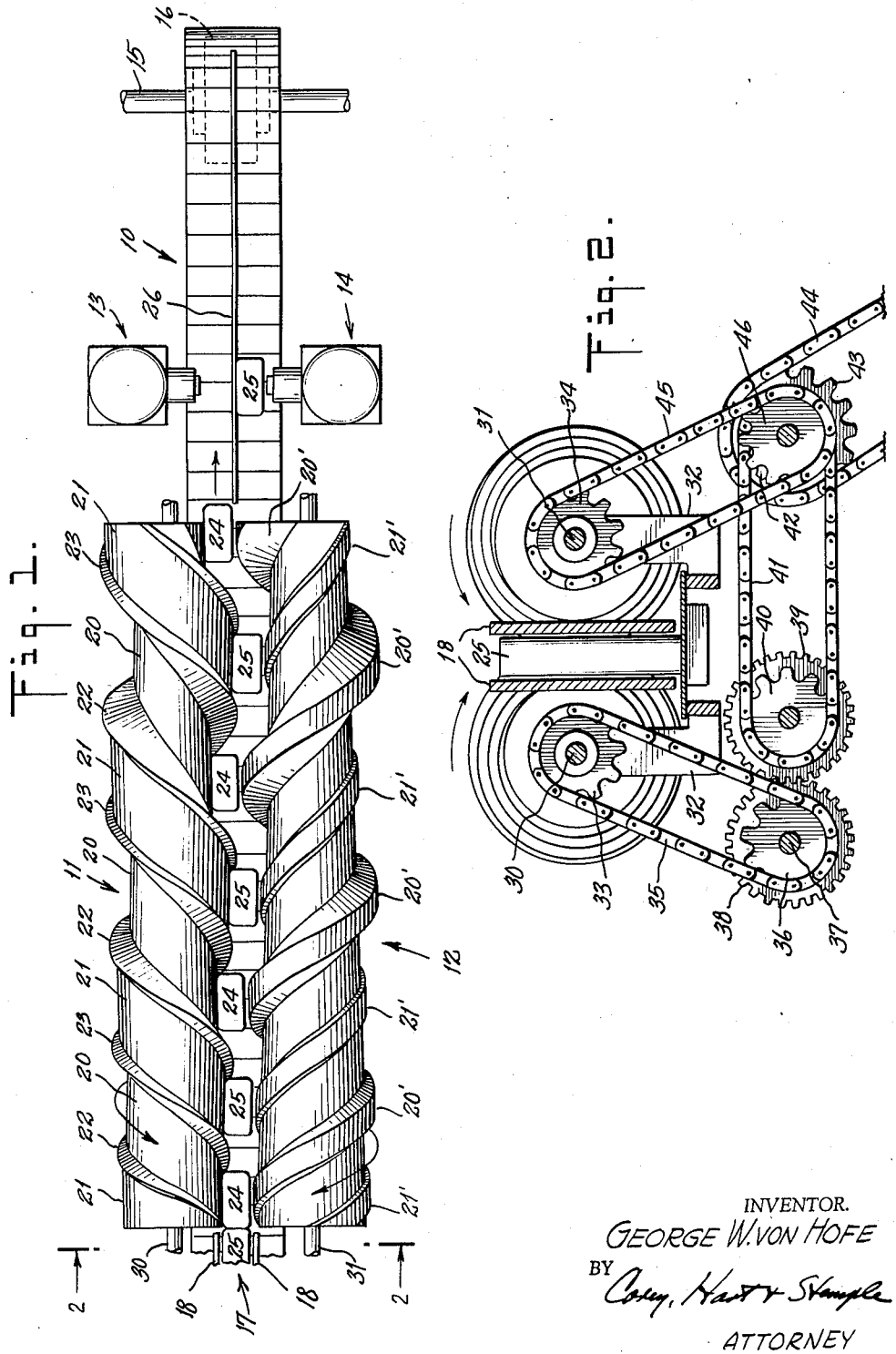

2,923,395

HIGH SPEED ARTICLE SEPARATOR

George W. Von Hofe, Millington, N.J., assignor to New Jersey Machine Corporation, Hoboken, N.J., a corporation of New Jersey Application April 3, 1958, Serial No. 726,165

4 Claims. (Cl. 198—31)

This invention relates to improvements in mechanism for separating articles in a line of feed thereof and is concerned more particularly with the provision of conveying means for dividing a single line of articles into a plurality of lines thereof while continuously advancing such articles at high speed.

Many of the packaging systems now being supplied to manufacturers of various products are designed for high speed work and some of these systems are capable of processing from 600 to 700 articles per minute. It is obvious that while in many systems having line speeds high enough to accomplish such production certain of the machines in the line can handle such a flow of material at full line speed, other machines in such systems, either because of the complexity of their operations, or for other reasons, require that the flow of articles thereto be at substantially lower rates of speed. Therefore, in order that the production level of such a system may be maintained as high as possible, it is necessary to include these slower operating machines therein in such number as is necessary to take care of the practicable capacity of the system. The inclusion of these additional slower operating machines in the system necessitates also that the main line of feed of the articles being processed be broken into a number of sublines of feed corresponding to the number of such slower machines. Multiplying the number of such slower machines in a system provides no operating problem. On the other hand, it is difficult to break a single high speed main line of article feed into a plurality of sublines of feed for many reasons. For example, it has been found impractical to form two lines of articles from a single line thereof merely by laterally displacing the articles into two lines, especially when the articles involved are composed of glassware such as glass bottles. At the high speeds with which we are here concerned, such lateral displacement has to be quite fast and consequently this necessitates the use of rapid blows with a force that is likely to break glass bottles. Additional problems are encountered when the line to be broken is preloaded, that is, the articles are touching one another under pressure. Since this pressure on the line may be as much as ten pounds, it will be understood that any appreciable further impact on the articles as may be necessary to accomplish the desired lateral displacement is liable to cause material damage to the displaced articles. This is particularly true in the case of glass bottles, and especially rectangularly-shaped glass bottles, because any substantial impact on one of these bottles squeezed in between other bottles under the line pressure behind it, will result in breakage of the bottles and disruption of the production line. Because of these and other difficulties, it was concluded to be of basic importance in effecting a separation of a line of articles, particularly bottles, to avoid any jerky motions or rapid changes of direction and that on the contrary, any change in the direction of the motion of the articles moving at high speed must be done very slowly and without the use of force. Further exploration of the problem however made it clear that this could not be accomplished by the aid of known types of guides and this was found to be especially true of any guide means of a stationary nature. It was only when applicant thought of the distance traveled by each article as a cycle of operation that it became apparent that any dividing mechanism to be successful must accomplish the dividing action in a multiplicity of cycles extending over a prolonged period so that the change in direction of the article occurs continuously and in a progressive fashion. This operation it was found can be achieved with purely rotary motion by means of two complementary worms.

The primary object of the invention accordingly is the provision of an article conveying system composed of a pair of complementary worms operating in conjunction with a continuously moving horizontal conveyor. The worms are so formed that as a line of articles is being advanced by the coaction of such worms and the conveyor, they will operate to displace alternate articles in the line to opposite sides of the longitudinal axis of the conveyor to create out of such main line of feed at a predetermined distance in advance of a plurality of machines, two sublines of feed of the articles to such machines. The construction and operation of the two worms are such that the main line of feed is broken up and the two sublines are formed gradually and continuously in a progressive fashion without interruption in the continued movement of the conveyor and the continuous feed of the articles supported thereon. These results are attained by driving the complementary worms in unison in opposite directions, by constructing each of such worms to have a double pitch helix formed in its outer surface with one spiral surface of the double pitch helix on such worm gradually diminishing in diameter and the other spiral surface thereof gradually increasing in diameter, and by arranging the spiral surfaces on such worm relative to the spiral surfaces on the other worm so that the spiral surface of diminishing diameter on such worm is associated with the spiral surface of increasing diameter on the other worm and the spiral surface of increasing diameter on such worm is associated with the spiral surface of diminishing diameter on the other worm.

It is believed that a better understanding of the invention as well as the advantages and features of novelty thereof, will be obtained from the following description when read in connection with the accompanying drawings, in which Fig. 1 is a top plan view of a conveyor system embodying the complementary worm arrangement of my invention; and Fig. 2 is an end view of such system to illustrate the means for driving the complementary worms.

In the drawings, the reference numeral 10 indicates generally the conveyor for transporting the articles to the complementary worms 11 and 12 and to the machines designated 13 and 14. The conveyor may be of any suitable type and construction and preferably should be capable of handling a wide variety of articles at high speed. For the purposes of illustration, the conveyor is shown in the drawing as a horizontal endless belt type of conveyor of sufficient length to support a line of articles to be fed to the worms 11 and 12 and to carry the articles beyond the machines 13 and 14. The conveyor is continuously driven by any conventional driving means including a motor suitably connected to the conveyor shaft 15 on which is mounted the drive pulley 16 of the conveyor. The rate of travel of the upper article supporting run of the conveyor is preferably greater than the speed of feed of the articles through the entry end of the worms 11 and 12 so that the line of articles presented to such working end is a preloaded, solid line 17 of articles. This line of articles is guided to the entry end of the worms by a pair of horizontal guide rails 18, 18 located above the upper run of conveyor 10 and extending to the entry end of the worm conveyors 11 and 12.

The worm or article conveyor 11 has a double pitch helix formed in its outer surface and constituted of two spiral grooves 20 and 21 defined by the spiral threads 22 and 23. Spiral thread 22 defines the right hand edge of groove 21 and the left hand edge of groove 20, as viewed in Fig. 1 of the drawings, and spiral thread 23 defines the left hand edge of groove 21 and the right hand edge of groove 20, as viewed in such figure. It will be noted that both of the spiral article engaging surfaces 20 and 21 which are in the nature of grooves, extend throughout the entire length of worm 11 and consequently both grooves are capable of feeding articles from the line 17 from the entry end of worm 11 to the discharge end thereof. Since the entry ends of the grooves 20 and 21 successively come into operative relation with the terminal article in line 17, each selects alternate articles in the line to advance the feed thereof towards the machines 13 and 14. Thus, the groove 20 will select from the line 17 and advance the articles designated 24 in Fig. 1, while the groove 21 will select from the line 17 and advance the articles designated 25 in such figure. It will be further noted that the convolutions of the grooves are of variable diameter. Groove, or helix 20 has its greatest diameter at the entry end of the worm 11 and gradually diminishes in diameter throughout the length of the worm so that at the discharge end of the worm the helix 20 is of minimum diameter. On the other hand, the groove or helix 21 has its smallest diameter at the entry end of the worm 11 and gradually increases in diameter throughout the length of the worm so that at the discharge end of the worm the helix 21 is of maximum diameter. It will thus be seen that as the articles are being conveyed by the worm 11, alternate of such articles will be gradually displaced to one side of the longitudinal axis of conveyor 10 and alternate of such articles will be gradually displaced to the other side of the longitudinal axis of the conveyor. Thus, the articles 24 conveyed by helix 20 will be gradually shifted laterally to the upper side of conveyor 10, as viewed in Fig. 1, as they travel towards the machines 13 and 14, while the article 25 conveyed by helix 21 will be gradually shifted laterally to the lower side of conveyor 10, as viewed in Fig. 1, as such articles travel towards the said machines. By the time the articles have reached the discharge end of worm 11 they will have been completely shifted to one side or the other of the longitudinal axis of the conveyor, as represented by the guide rail 26, and will be discharged from worm 11 as two separate sublines of articles. The subline of articles 24 will be carried from worm 11 to machine 13 by the conveyor 10, which will also simultaneously carry the subline of articles 25 to machine 14.

The aforesaid breaking up or separation of main line 17 into two separate sublines by the worm 11 is accomplished by the coaction of the complementary worm 12. As is shown in Fig. 1, worm 12 is also provided with a double pitch helix in its outer surface. In the case of worm 12, however, the double pitch helix is composed of two spiral threads 20' and 21' which are opposed to and complement the spiral surfaces 20 and 21, respectively. It will be noted that contrary to helix 20, the complementary helical surface 20' has its smallest diameter at the entry end of the worm 12 and gradually increases in diameter throughout the length of such worm. The progressive rate of increase in the diameter of helix 20' corresponds to the rate of decrease in the diameter of helix 20 so that at any point in the lengths of worms 11 and 12 the spacing between opposing surface portions of helices 20 and 20' will be the same. This spacing is slightly greater than the width of the articles 24 traveling along between the worm conveyors so that as such articles are being advanced by the associated thread 22 of conveyor 11, the helices 20 and 20' positively control the lateral displacement of such articles. In a similar fashion, contrarywise, the helical surface 21' has its greatest diameter at the entry end of worm 12 and gradually decreases in diameter throughout the length of the worm at the same rate that the helix 21 of worm 11 increases in diameter towards the discharge end of such worm 11. The spacing between the helices 21, 21' throughout their lengths is substantially the same as the spacing between the helices 20, 20', so that as the articles 25 are being advanced by the associated thread 23 of conveyor 11, the helices 21, 21' in a similar fashion will positively control the lateral displacement of such articles.

The worm conveyors 11 and 12 are mounted on shafts 30 and 31, respectively, for rotative movement in opposite directions as indicated by the arrows in the drawings. The shafts 30 and 31 are journaled for rotation on bearing brackets 32, 32 mounted on the frame of the conveyor system (note Fig. 2) and are provided with sprockets 33, 34, respectively. Sprocket 33 is connected by a chain 35 to a sprocket 36 secured to a shaft 37 to which is also secured a driven gear 38. Engaged with gear 38 is a gear 39 which is connected through sprocket 40, chain 41, sprocket 42, sprocket 43 and chain 44 to suitable driving means such as an electric motor. The sprocket 34 is connected by chain 45, sprocket 46, sprocket 43 and chain 44 to the same driving means. It will therefore be seen that the two worms 11 and 12 are driven in unison by the same driving means though in opposite directions.

From the foregoing, it will be apparent that in operation the conveyor 10 delivers a main line 17 of articles to the entry end of the worm conveyors 11 and 12. The speed of conveyor 10 is relatively fast and depends on the line speed that can be handled by the packaging system in which the conveying mechanism of this invention is included. The conveyors 11 and 12 continuously deliver the bottles in line 17 to the machines 13 and 14 and as they do so continuously and progressively laterally move alternate bottles in oppoiste directions to form a line of bottles 24 which are fed by the conveyor 10 to machine 13 and to form a line of bottles 25 which are fed simultaneously by the conveyor 10 to machine 14. For the purpose of illustration, the machines 13 and 14 have been shown as label applying units disposed in opposed relation on opposite sides of the conveyor 10. The labeling units may be of the reciprocating type well known in the art and operative in the advancing movements thereof to deposit labels on successive articles. Following the operations of the machines 13, 14, the articles may be further processed or collected for shipment in two separate lines, or the two lines of articles may be recombined into a single main line of feed by two worm conveyors constructed similarly to worms 11 and 12 but arranged to function in a reverse fashion as will be evident from the foregoing description, and such single main line delivered to a machine in the system capable of processing the articles at a higher speed than the machines 13 and 14.

While I have hereinabove described and illustrated in the drawings a preferred embodiment of my invention, it will be apparent to those skilled in the art that various changes and modifications may be made therein without departing from the spirit of the invention or the scope of the appended claims.

I claim:

1. In an article handling system, means for feeding articles to a predetermined place in the path of travel of such articles, means beyond such place for advancing the articles and simultaneously displacing certain thereof laterally relative to others thereof, said advancing and displacing means comprising a pair of parallelly arranged, complementary worms, said worms being spaced from one another and having twisted external configurations formed by winding double pitch helixes throughout the lengths thereof, one of said worms being formed of two spiral grooves of substantially uniforms widths throughout their lengths, each of said grooves extending throughout the entire length of the worm and having an entry end at one end of the worm and a discharge end at the other end of the worm, one of said spiral grooves gradually diminishing in diameter from its entry end to its discharge end and the other of said spiral grooves gradually increasing in diameter from its entry end to its discharge end, the other of said worms being provided with two spiral threads the external article engaging surfaces thereof being of substantially uniform configurations throughout their lengths, each of said threads extending throughout the entire length of said other worm in opposed and complementary relation to a groove on said one worm so that as the articles are fed by such worms they each move in a groove of said one worm and between such groove and a thread on the other worm, said thread complementary to the groove of diminishing diameter gradually increasing in diameter from the entry end of said other worm and said thread complementary to the groove of increasing diameter gradually diminishing in diameter from the entry end of said other worm, and means to continuously rotate said worms in unison and in opposite directions.

2. An article handling system such as defined in claim 1, in which said grooves have plain inner walls and are separated from each other by relatively thin threads located between the threads on said other worm and constituting the means for both of said worms for advancing the articles therethrough.

3. An aricle handling system such as defined in claim 1, in which said threads have plain external article engaging surfaces of material width and substantially uniform throughout the lengths of said threads.

4. An article handling system such as defined in claim 1, in which the linear speed of article feed by said feeding means is greater than the speed of feed of the articles through the entry end of said rotating worms and such that the line of articles presented to said entry end is a preloaded, solid line of articles.

References Cited in the file of this patent
UNITED STATES PATENTS

| | | |
|---|---|---|
| 2,363,189 | Magnusson | Nov. 21, 1944 |
| 2,857,037 | Breeback | Oct. 21, 1958 |